United States Patent [19]
Hanagata et al.

[11] Patent Number: 4,839,674
[45] Date of Patent: Jun. 13, 1989

[54] RECORDER-MEDIUM REGISTRATION SYSTEM

[75] Inventors: Takayoshi Hanagata, Yamato; Shigemitsu Tazaki, Matsudo, both of Japan

[73] Assignee: Canon Kabushiki Kaisha, Tokyo, Japan

[21] Appl. No.: 147,628

[22] Filed: Jan. 25, 1988

Related U.S. Application Data

[63] Continuation of Ser. No. 879,546, Jun. 24, 1986, abandoned, which is a continuation of Ser. No. 609,200, May 11, 1984, abandoned.

[30] Foreign Application Priority Data

May 25, 1983 [JP] Japan .................................. 58-90761

[51] Int. Cl.[4] ........................ B01D 15/24; B41J 11/42; B65H 54/64

[52] U.S. Cl. ................................ 346/136; 346/76 PH; 346/140 R; 226/3; 226/27; 271/227; 242/57.1; 400/579; 364/900; 364/519

[58] Field of Search .............. 346/136, 76 PH, 140 R; 400/579; 364/469, 519, 900; 242/57.1; 226/3, 27, 29; 271/227; 101/181

[56] References Cited

U.S. PATENT DOCUMENTS

| | | | |
|---|---|---|---|
| 3,874,791 | 4/1975 | Thieme et al. | 355/41 X |
| 4,025,025 | 5/1977 | Bartel et al. | 226/33 |
| 4,216,482 | 8/1980 | Mason | 346/129 |
| 4,438,917 | 3/1984 | Janssen et al. | 271/227 |
| 4,479,194 | 10/1984 | Fogg et al. | 364/900 |
| 4,485,982 | 12/1984 | St. John et al. | 242/57.1 |
| 4,508,462 | 4/1985 | Haruhara | 400/70 |
| 4,532,596 | 7/1985 | Pugsley | 364/469 X |

OTHER PUBLICATIONS

IBM, Device for Feeding and Registering Paper, Tech. Disc. Bull., vol. 20, No. 4, Sep. '77, Bantz and Evangelisti.

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

In a recorder, at least one set of marks spaced by a predetermined distance in a feed direction of a record paper are recorded on the record paper, the marks are detected by a detector while the record paper is fed, a time interval between detections of the marks is compared with a reference number of pulses applied to paper feed motors to detect a deviation, and rotations of the left and right paper feed motors are controlled to control the feed of record medium.

14 Claims, 4 Drawing Sheets

RECORDER-MEDIUM REGISTRATION SYSTEM

This application is a continuation of application Ser. No. 879,546 filed 6/24/86, now abandoned, which was a continuation of application Ser. No. 609,200 filed 5/11/84, now abandoned.

BACKGROUND OF THE INVENTION

1. Field of the Invention

The present invention relates to a recoder, and more particularly to a serial printer type recorder which can precisely feed a record medium.

2. Description of the Prior Art

Various recorders such as a wire dot printer and an ink jet printer which print characters with a recording head having a plurality of recording elements while moving the recording head widthwise of a record medium.

Those recorders are widely used as image printers because they can print not only characters but also patterns and lines using dots.

However, image recording by such recorders is not always of high quality.

For example, when an image is recorded by a wire dot printer having seven wires as shown in FIG. 1A, if paper is fed too much, a gap is created between an upper row of seven dots and a lower row of seven dots in adjacent lines.

Conversely, if the paper feed is too less, the upper dots and the lower dots overlap as shown in FIG. 1B and a dark double-print area 2 is created.

Thus, a gap area or double-print area is created by the error in the paper feed.

In order to avoid the above problem, a slip between the record medium and the feed roller should be zero and the record medium should always be fed by an exactly constant amount which is impracticable.

For example, if a record paper 3 is obliquely set in the recorder as shown in FIG. 2, the record paper 3 is gradually shifted left as shown by chain lines for each paper feed even if the paper is fed in a direction of an arrow without slip, and eventually contacts edge 4 of the recorder and jams.

In prior art recorders, the jam is prevented in the following manner, at the sacrifice of the quality of the image recording.

In one method, a longer paper guide than the paper width is provided to minimize skewing of the record paper. In another method, a paper feed roller is designed to slip when a heavy load is applied thereto so that the direction of the paper feed is changed by the increasing load when the record paper contacts to the edge of the recorder.

The latter method is explained with reference to FIG. 3.

Numeral 8 denotes a locus showing the feed direction of the record paper 3 in an exaggerated manner, and numerals 5–7 denote positions at which the record paper 3 contacts an edge.

If the paper feed direction is changed, the record paper necessarily snakes; the smaller the difference between the width of the paper guide and a width of the paper and the longer the paper guide, the smaller the amount of snake. In practice, however, the size of the record paper is not exact, and in a recorder which uses wide record papers, the recorder will be of large size of the paper guide width is increased.

As a result, the gap or the double print occurs at the contact points 5–7.

When wider record papers or thin record papers are used, they cannot be even snaked and thus jam at the first contact point 5.

SUMMARY OF THE INVENTION

It is an object of the present invention to provide a recorder which can feed a record medium such as a record paper without snaking.

It is another object of the present invention to provide a recorder having means for printing a mark on a record medium and detecting the mark after the record medium has been fed to determine if the distance of movement of the record medium is a predetermined amount to control feed means.

It is still another object of the present invention to provide a recorder which comprises feed means for feeding a record medium, detection means for detecting an edge of the record medium, and correction means for determining the position of the record medium by the detection means and, if the position is deviated from a predetermined position, controlling the feed means to correct the position.

It is yet another object of the present invention to provide a recorder which comprises a plurality of drive means for driving a record medium, and means for controlling the drive means to correct the position of the record medium.

It is a further object of the present invention to provide a recorder which comprises record means for recording on a record medium, feed means for feeding the record medium and means for determining the feed amount by the number of pulses applied to the feed means.

It is a still further object of the present invention to provide a recorder which comprises feed means for feeding a record medium, detection means for detecting a position of the record medium and means for correcting a deviation of the position of the record medium detected by the detection means from a normal position by the feed means.

It is yet a further object of the present invention to provide a recorder which comprises feed means for feeding a record medium, detection means for detecting a position of the record medium and means for disabling the recorder when the position of the record medium detected by the detection means deviates from a normal position.

BRIEF DESCRIPTION OF THE DRAWINGS

FIGS. 1–3 show prior art in which;

FIG. 2 illustrates an obliquely loaded paper,

FIG. 3 illustrates snaking of the record paper,

FIGS. 4–8 show an embodiment of the present invention in which;

FIG. 4 illustrates an example of a record,

FIG. 5 is a perspective view of a recorder,

FIG. 6 is a diagram showing a relation between the number of times of paper feed and a differential output voltage of a detector, FIG. 7 is a diagram showing a relation between the number of paper feed pulses and the number of correction pulses, and FIG. 8 is a block diagram of a control circuit.

DETAILED DESCRIPTION OF THE PREFERRED EMMBODIMENTS

Figure 1A:
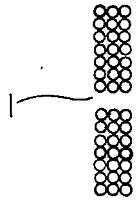
FIG. 1A illustrates a gap area.
Figure 1B:
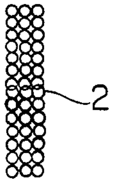
FIG. 1B illustrates a double-print area.
Figure 2:
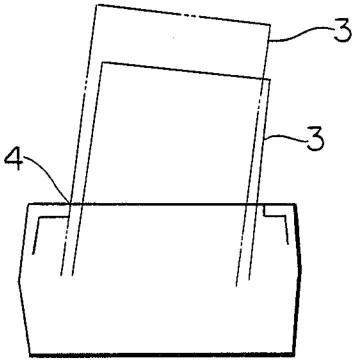
Figure 3:
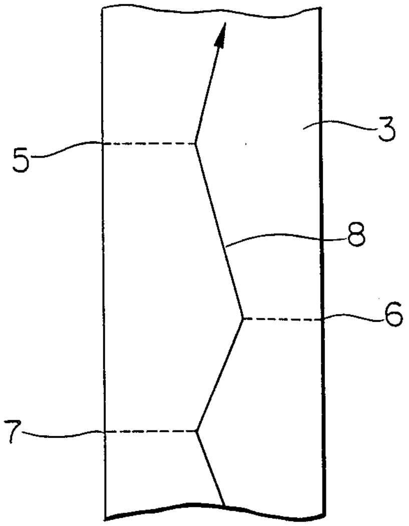
Figure 4:
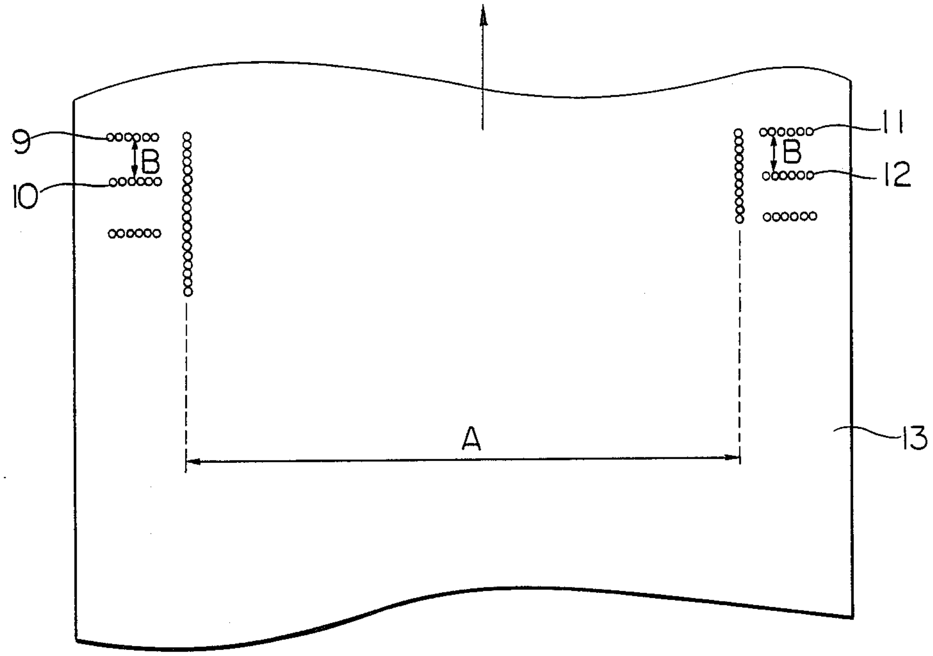

FIG. 4 shows an example of a record by the present recorder.

A symbol A shows a normal record area on a record paper 13, and numerals 9–12 denote marks recorded outside the record area A by one or more recording elements of a recording head.

Figure 5:
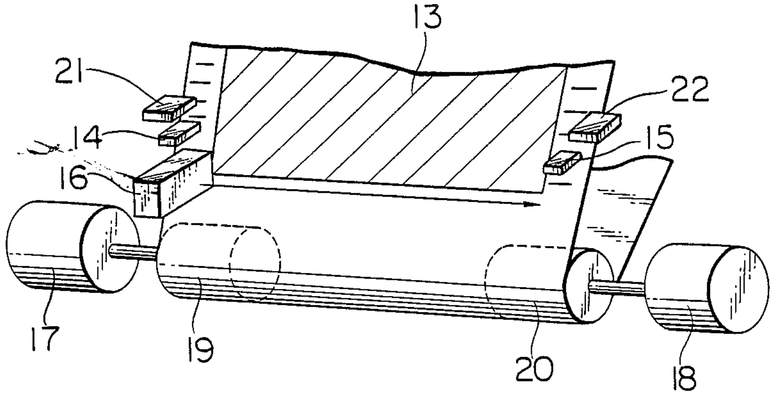

One embodiment for such a recorder is shown in FIG. 5.

Numeral 16 denotes a recording head which may be an on-demand ink jet head. The recording head 16 is moved horizontally as shown by an arrow by means not shown to record images within the record area A.

After the recording, the recording head 16 is returned to a left end home position. The marks 9 and 11 are recorded outside the record area A before and after the image recording.

The record paper 13 is then fed by a predetermined distance B shown in FIG. 4 by paper feed rollers 19 and 20 which are independently driven by pulse motors 17 and 18, respectively.

If there is no slip between the record paper 13 and the feed rollers 19 and 20 and there is no wrinkle or fold on the record paper 13, the number of pulses to be applied to the pulse motors 17 and 18 in order to feed the record paper 13 by the predetermined amount B must be constant.

In the present embodiment, the number of pulses for the above purpose is 100.

Numerals 14 and 15 denote detectors which may be combinations of light emitting diodes and phototransistors and detect the marks 9 and 11, respectively.

Detectors 21 and 22 for detecting a widthwise position of the record paper 13 are provided, one for each of the detectors 14 and 15.

In the present embodiment, the pulses to the pulse motors are determined in the following manner.

If the distance between the marks 9 and 10 and the distance between the marks 11 and 12 detected with an abnormally smaller number of pulses (e.g. 95 or less) than a normal 100 pulses, it is considered that dirt or dust on a record paper have been detected and it is neglected.

If those marks are not detected before an abnormally larger number of pulses (e.g. 105 or more) than the normal 100 pulses is reached, it is considered that a jam has occurred or the recording head did not record the mark, and an alarm is issued or the apparatus is stopped.

The detectors 21 and 22 monitor the edges of the record paper 13 to detect the edges of the record paper 13 by a difference between a ground color of a platen, not shown, and a ground color of the record paper 13.

Thus, by monitoring a difference between the output voltages of the detectors 21 and 22, the position of the record paper 13 can be measured.

Figure 6:
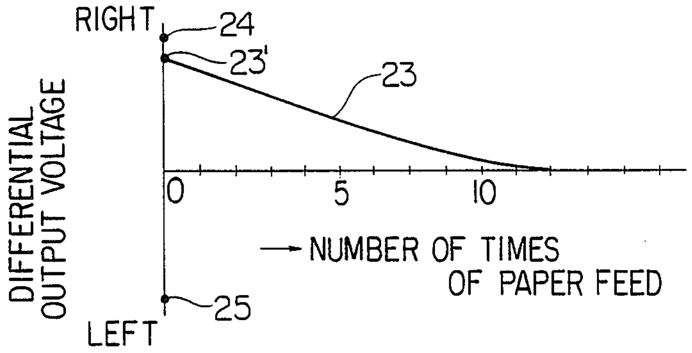

FIG. 6 shows a relation between the number of times of paper feed and the differential output voltage of the detectors 21 and 22. A curve 23 indicates the differential output voltage.

For example, when the number of times of paper feed is 0, the output voltage difference is 23′, which indicates that the record paper 13 is fairly offset to the right.

If the value exceeds a limit value 24 or 25, an alarm is issued or the apparatus is stopped.

The record paper 13 is fed by the pulse motors 17 and 18 until the detectors 14 and 15 detect the marks 9 and 10 and the marks 11 and 12, respectively, and if the differential output voltage of the detectors 21 and 22 is not zero, one of the pulse motors 17 and 18 is rotated forwardly and the other is rotated backwardly so that a corrective rotation is made in accordance with the differential voltage to feed the record paper straight forward.

When the differential output voltage is small, the number of correction pulse is one, and when the differential output voltage 23 is large enough to be close to the limit value 24 or 25, the number of correction pulses is five or less.

Figure 7:
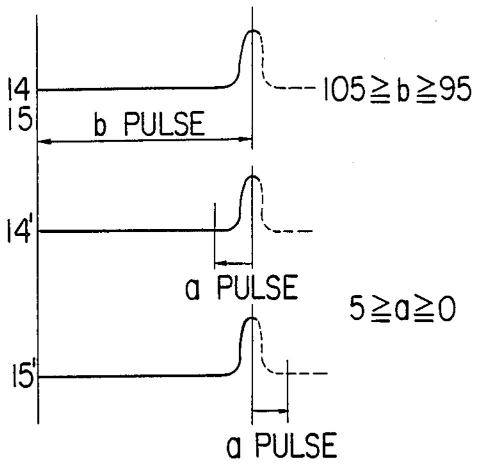

FIG. 7 shows a relation between the outputs of the detectors 14 and 15, and the number of paper feed pulses b and the number of correction pulses a.

The number of paper feed pulses b is $105 \geqq b \geqq 95$, and the number of correction pulses a is $5 \geqq a \geqq 0$.

With those settings, the differential output voltage 23 approaches zero as the number of times of paper feed increases.

After it has reached zero, the number of correction pulses is 1 or 0 so that the gap or the double-print on the record paper 13 is essentially inappreciable.

Figure 8:
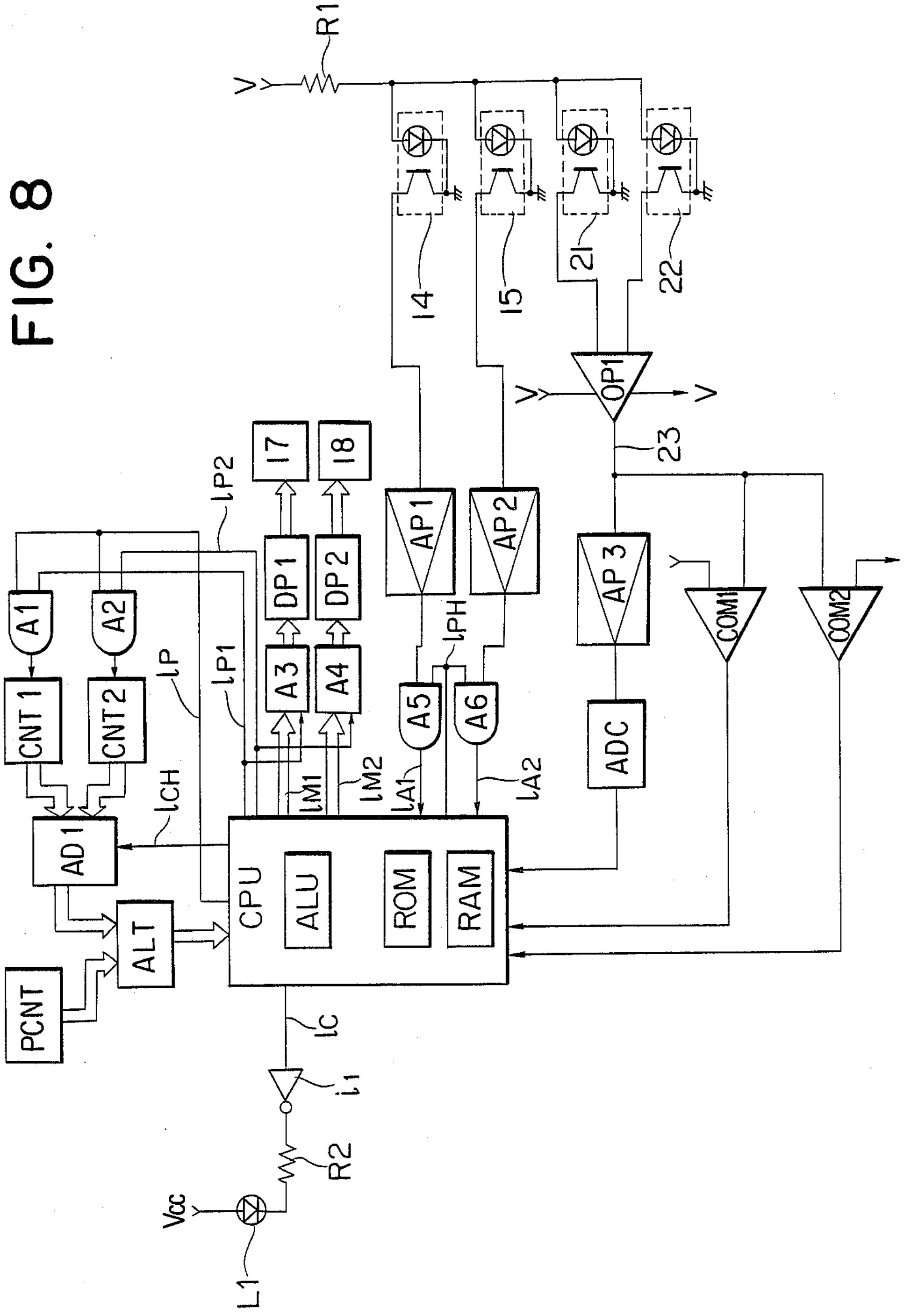

FIG. 8 is a block diagram of a control circuit for the above operation. The like elements to those shown in FIGS. 1–7 are designated by the like numerals.

A detail of the control operation is now explained with reference to FIG. 8.

A central processing unit CPU has a ROM which contains a control program, an ALU for carrying out arithmetic operations and a RAM for temporarily storing data.

When the record paper 13 is to be fed by a predetermined distance B, the central processing unit CPU issues signal levels "1" to signal lines $l_{P1}$ and $l_{P2}$ to open AND gates A1 and A2, and issues signal levels "1" to signal lines $l_{M1}$ and $l_{M2}$ to drive the pulse motors 17 and 18 by pulse motor drivers DP1 and DP2 through the AND gates A3 and A4 which are opened by the signal lines $l_{P1}$ and $l_{P2}$.

The number of pulse motor drive pulses is 100 in the present embodiment.

A pulse motor drive pulse count setting circuit PCNT determines the number of pulses.

The pulse motor drive pulses are also supplied to counters CNT1 and CNT2 through the AND gates A1 and A2 opened by the signal line $l_p$ for each pulse, and they are counted in timed relation to the drive of the pulse motor. For each count, the CPU switches a signal line $l_{CH}$ between "1" and "0" so that an AND gate AD1 alternately gates the contents of the counters CNT1 and CNT2, and a difference between the content 100 of the setting circuit PCNT and the count is calculated by an arithmetic circuit ALT, and the difference is supplied to the CPU and checked by the CPU at each pulse output.

After the CPU issued the pulses for driving the pulse motors 17 and 18, the CPU issues the signal level "1" to the signal line $l_{PH}$ to open AND gates A5 and A6 so that the signals from the detectors 14 and 15 which are combinations of light emitting diodes and phototransistors and amplified by amplifiers AP1 and AP2 are read into the CPU.

Assume that the record paper 13 was fed by the drive of the pulse motors 17 and 18 but no mark 9 or 11 was detected. In this case, the signal levels on the signal lines $l_{A1}$ and $l_{A2}$ are "0". If one or both of the marks 9 and 11 are detected by the detectors 14 and 15 as the record paper 13 is fed, one or both of the signal lines $l_{A1}$ and $l_{A2}$ assume the "1" level and the CPU recognizes that one or both of the marks 9 and 11 were detected.

If one or both of the marks 9 and 11 are detected, the CPU sets the pulse motor drive pulse output and one or both of the signal lines $l_{P1}$ and $l_{P2}$ to "0" to close one or both of the AND gates A1 and A2, stop one or both pulse outputs to the counters CNT1 and CNT2 and stop one or both of the pulse motors 17 and 18.

The pulse motor 17 and the counter CNT1 are associated with the detector 14, and the pulse motor 18 and the counter CNT2 are associated with the detector 15.

For example, if the detector 14 detects the mark 9, the pulse motor 17 and the counter CNT1 are stopped.

The difference between the content of the counter CNT1 and the content of the setting circuit PCNT is checked, and if it is larger than −5, it is ignored as the detection of dust and the signal line $l_{P1}$ is set to "1" to open the AND gates A1 and A3, and the pulse motor drive pulse output and the pulse output to the counter CNT1 are continuously produced to continue the paper feed. The above operation is continued until the true mark 9 is detected.

On the other hand, since the detector 15 which does not detect the mark 11 produces no output, the pulse motor 18 is continuously driven to feed the paper. As the record paper 13 is fed without the detection of one or both of the marks 9 and 11 and the difference between the content of one of the counters CNT1 and CNT2 and the content 100 of the setting circuit PCNT is larger than +5, CPU determines that a jam or other accident has occurred and sets the signal lines $l_{P1}$, $l_{P2}$, $l_{M1}$ and $l_{M2}$ to "0" to stop the pulse motors 17 and 18, and sets the signal line $l_C$ to "1" to change an output of an inverter il to "0" so that a lamp L1 is turned on to issue an alarm and the apparatus is stopped.

In this manner, if at least one of the detectors 14 and 15 detects a mark, the drive of the associated one of the pulse motors is stopped while the other is continuously driven. The latter is stopped after the mark is detected.

The count of the paper feed is checked, and if the count n is $95 < n < 105$, the paper feed is determined to be normal.

However, if at least one of the marks is not detected when the counts of the counter CNT1 and CNT2 reach 105 or higher, the apparatus is stopped.

On the other hand, the detectors 21 and 22 monitor the edges of the record paper 13, and if the record paper 13 is skewed, the lights from the light emitting diodes of the detectors 21 and 22 are prevented from impinging on the phototransistors.

If the record paper 13 is at a normal position when the paper feed is zero, the outputs of the two detectors are same and an output from an operational amplifier OP1 which produces a difference therebetween is zero.

On the other hand, if the record paper 13 is offset to one side, particularly when the limit values 24 and 25 of FIG. 5 are exceeded, the voltages are compared by comparators COM1 and COM2, and the comparator COM1 produces an output to the CPU when the limit value 24 is exceeded, and the comparator COM2 produces an output when the limit value 25 is exceeded, and the alarm is issued and the apparatus is stopped.

If the output voltage is 23′ when the comparators COM1 and COM2 produce no output, the limit values are not exceeded and the differential voltage is not "0", the output voltage is supplied to the CPU through an amplifier AP3 and an A/D converter ADC.

Thus, the CPU supplies the signals to the pulse motor drivers DP1 and DP2 through the signal lines $l_{M1}$ and $l_{M2}$ so that the pulse motor 17 is rotated backwardly and the pulse motor 18 is rotated forwardly, to feed the record paper 13 and correct the skew of the record paper 13.

The correction pulses are produced by A-D converting the difference between the output voltages of the detectors 21 and 22 and are five pulses at maximum. They correct the skew together with the outputs of the detectors 14 and 15 so that the gap or the double-print on the record paper is prevented.

In accordance with the present embodiment, the skew of the record paper can be prevented and the image recording without gap or double-print is attained.

If the record paper is relatively narrow, the paper guide is long and the snaking of the record paper is small, only the paper feed quantity need be exactly controlled. In this case, the mark may be recorded on only one edge and only one mark detector may be used and the record paper edge detectors 21 and 22 are not necessary.

When the record paper is wide and thin and not so long and loaded somewhat obliquely and the paper is ejected from the apparatus before it jams, the marks should be recorded on the left and right edges and two mark detectors are required but the record paper edge detector is not necessary.

As described hereinabove, in accordance with the present invention, at least one set of marks spaced by a predetermined distance in the direction of paper feed are recorded on the record paper outside the record range, the marks are detected by the detector while the record paper is fed, the time interval between the detection is compared with the reference number of pulses applied to the paper feed drive pulse motors to detect the skew, and the rotations of the left and right paper feed motors are controlled to control the feed amount of the record paper. Accordingly, the snaking of the record paper is prevented and the image recording without gap or double-print is attained.

What we claim is:

1. Printing apparatus operable for feeding a recording medium, comprising:

recording means disposed at a recording station for performing repeated recording operations on the recording medium to record, in parallel and in the same recording operation, description information and a separate control mark on the recording medium;

feed means for feeding the recording medium to said recording station before a recording operation;

detection means for detecting, before a recording operation, the control mark recorded on the recording medium by said recording means in a previous recording operation; and control means for controlling said feed means in response to the output of said detection means to properly position the recording medium at said recording station before the next recording operation.

2. Printing apparatus according to claim 1, wherein said recording means records the control marks at a plurality of positions on the recording medium and the appparatus further comprises a plurality of detection means.

3. Printing apparatus according to claim 2, wherein said plural detection means are arranged at left and right ends of the recording medium.

4. Printing apparatus according to claim 1, wherein said feed means includes a pulse motor.

5. Printing apparatus according to claim 1, wherein said detection means includes a light emitting diode and a photo-transistor.

6. Printing apparatus according to claim 4, further comprising a pulse count setting circuit for setting the number of pulses issued by said motor representing the normal range.

7. Printing apparatus according to claim 1, wherein said recording means scans the recording medium during a recording operation and records a control mark and the description information in a scan.

8. Printing apparatus according to claim 1, wherein said recording means records the control mark at the start of a scan of said recording means.

9. Printing apparatus according to claim 1, further comprising converting means for converting a feed distance of the recording medium to a number of pulses, wherein said control means controls said feed means by determining whether or not the number of pulses representing the feed distance of the recording medium is within a normal range based on the output of said detection means.

10. Printing apparatus operable for feeding a record medium, comprising:

feed means for feed the record medium in a feed direction;

recording means disposed at a recording station for performing repeated recording operations on the record medium to record, in parallel and in the same recording operation, image information and a separate detectable mark after the record medium is fed to said recording station by said feed means;

first detection means for detecting the position of the edges of the record medium transverse to the feed direction;

second detection means for detecting, before a recording operation, the position relative to the feed direction of the detectable mark recorded on the record medium in a previous recording operation; and control means for controlling said feed means by determining from the ouput of said first detection means the position shift of the record medium in the transverse direction and for determining from the output of said second detection means the position shift of the record medium in the feed direction in order to properly position the record medium at said recording station before the next recording operation.

11. Printing apparatus according to claim 10, wherein said recording means scans the record medium during a recording operation and records a detectable mark and image information in a scan.

12. Printing apparatus according to claim 10, wherein said recording means records the detectable mark at the start of a scan of said recording means.

13. Printing apparatus operable for feeding a recording medium, comprising:

feed means for feeding the record medium;

recording means disposed at a recording station for performing repeated recording operations on the record medium to record, in parallel and in the same recording operation, description information and a separate control pattern after the record medium is fed to said recording station by said feed means;

read-out means for reading out, before a recording operation, the control pattern recorded on the record medium by said recording means in a previous recording operation; and control means responsive to the output of said read-out means for controlling said feed means to properly position the record medium at said recording station before the next recording operation.

14. Printing apparatus according to claim 13, wherein said recording means records the control pattern comprising at least one of a group of characters, figures and symbols on the record medium.

* * * * *

UNITED STATES PATENT AND TRADEMARK OFFICE

CERTIFICATE OF CORRECTION

PATENT NO. : 4,839,674

DATED : June 13, 1989

INVENTOR(S) : TAKAYOSHI HANAGATA, ET AL.

It is certified that error appears in the above-identified patent and that said Letters Patent is hereby corrected as shown below:

IN [57] ABSTRACT

Line 8, "the" should be deleted.
Line 9, "of record" should read --of the record--.

COLUMN 1

Line 16, "which" should be deleted.
Line 30, "less," should read --little,--.
Line 38, "amount" should read --amount,--.
Line 43, "edge 4" should read --an edge 4--.
Line 53, "to" should be deleted.
Line 63, "the paper guide" should read --a paper guide-- and "a width" should read --the width--.
Line 67, "of" (second occurrence) should read --if--.

COLUMN 2

Line 53, "which;" should read --which:--.
Line 59, "which;" should read --which:--.

COLUMN 3

Line 2, "EMMBODIMENTS" should read --EMBODIMENTS--.
Line 41, "detected" should read --are detected--.
Line 44, "have" should read --has--.

COLUMN 4

Line 9, "correction pulse" should read --correction pulses--.
Line 56, "issued" should read --has issued--.
Line 58, "$1_{PH}$to" should read --$1_{PH}$ to--.

UNITED STATES PATENT AND TRADEMARK OFFICE
CERTIFICATE OF CORRECTION

PATENT NO. : 4,839,674

DATED : June 13, 1989

INVENTOR(S) : TAKAYOSHI HANAGATA, ET AL.

It is certified that error appears in the above-identified patent and that said Letters Patent is hereby corrected as shown below:

COLUMN 5

Line 54, "same" should read --the same--.

COLUMN 6

Line 67, "appparatus" should read --apparatus--.

COLUMN 7

Line 17, "claim 1," should read --claim 7,--.

Signed and Sealed this

Eighth Day of May, 1990

*Attest:*

HARRY F. MANBECK, JR.

*Attesting Officer*

*Commissioner of Patents and Trademarks*